March 18, 1924. 1,487,487
A. STARK
DRAFT EQUALIZER
Original Filed July 10, 1922 2 Sheets-Sheet 1
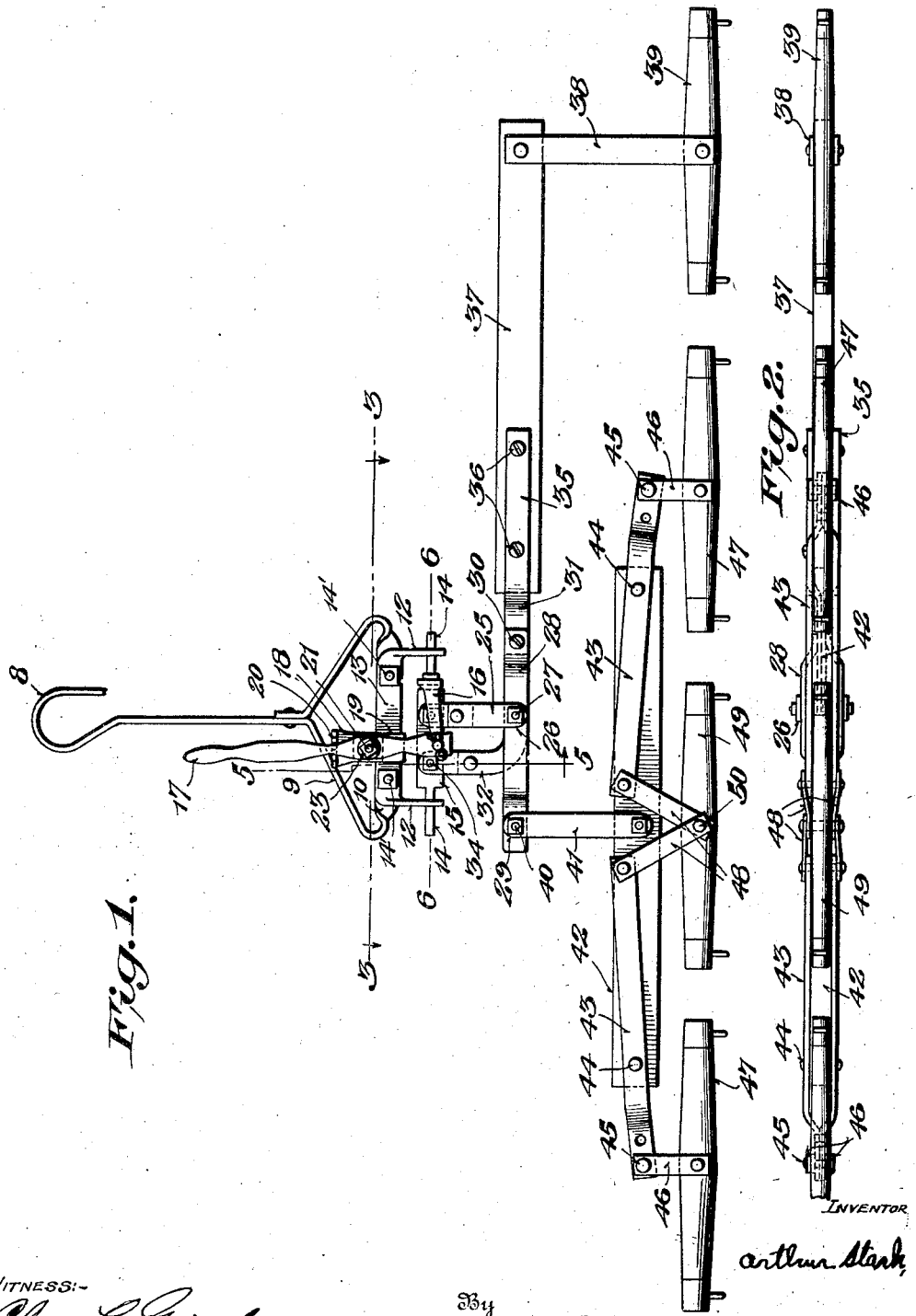

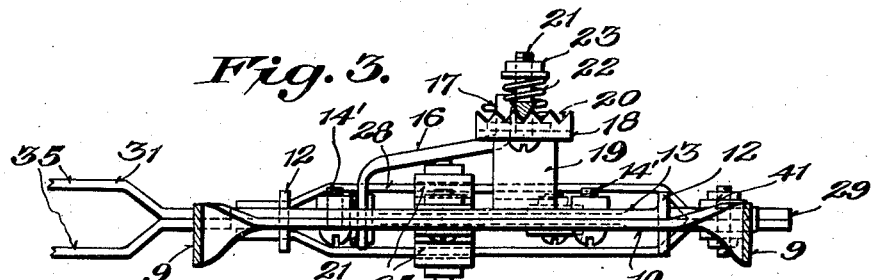
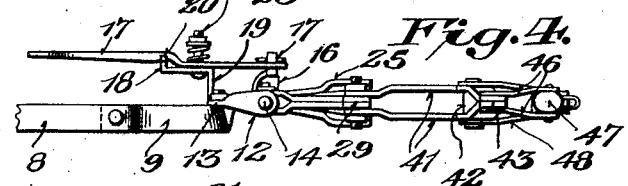
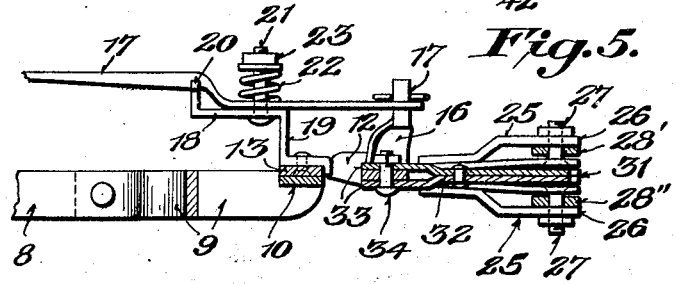
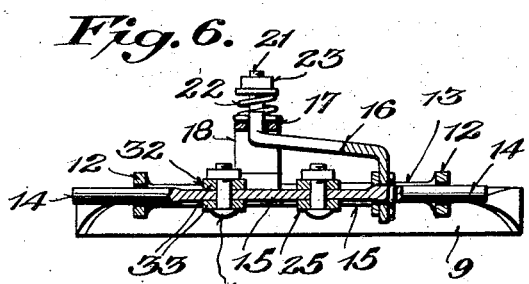
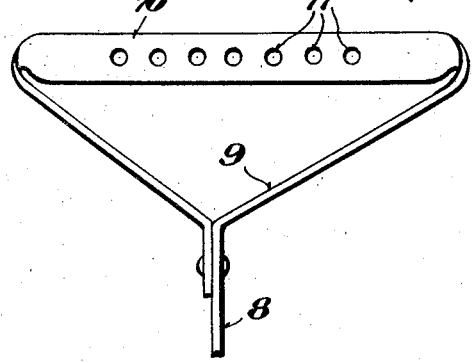

Patented Mar. 18, 1924.

1,487,487

UNITED STATES PATENT OFFICE.

ARTHUR STARK, OF RALSTON, NEBRASKA.

DRAFT EQUALIZER.

Application filed July 10, 1922, Serial No. 573,337. Renewed January 22, 1924.

*To all whom it may concern:*

Be it known that I, ARTHUR STARK, a citizen of the United States, residing at Ralston, in the county of Douglas and State of Nebraska, have invented certain new and useful Improvements in Draft Equalizers, of which the following is a specification, reference being had therein to the accompanying drawings.

This invention relates to means to equalize the draft of three or more draft-animals on a plow, vehicle, or other thing being drawn.

The equalizer provided by the invention is adapted particularly for use with plows.

It is an object of the invention so to arrange the several parts that the animal on the plowed side (usually the right-hand side) may walk directly in a furrow. When more than two draft-animals are used, it is necessary for the plow to be toward the furrow side of the center of the team. It is an object of the invention to equalize, under such conditions, the pull of the animals, in order to avoid imposing on the furrow-side animal the necessity of pulling more than the animal on the opposite side.

With some draft devices now in use, there is a tendency to throw the plow to one side or the other and out of the ground when the draft-animals are not walking evenly, but this condition is avoided with use of the equalizer of this invention.

The invention further provides means whereby the point of pull of the team on the plow or other thing being drawn may be shifted easily to one side or the other while the equalizer is in use. This arrangement is of advantage particularly when plowing on a sidehill, as by the shifting the plowshare may be caused to throw uphill rather than over the furrow.

When considered in connection with the description herein, the characteristics of the invention will be apparent from the accompanying drawings, forming part hereof, wherein an embodiment of the invention as adapted to a four-animal team is disclosed, for purposes of illustration.

Although the disclosures herein exemplify what now is considered to be a preferable embodiment of the invention, it is to be understood that it is not the intention to be limited necessarily thereto in interpretation of the claims, as adaptations and modifications within the limits of the claims can be made without departing from the nature of the invention.

Like reference-characters refer to corresponding parts in the views of the drawings, of which—

Fig. 1 is a plan view;
Fig. 2 is a front elevation;
Fig. 3 is a rear elevation;
Fig. 4 is a side elevation;
Fig. 5 is a section on the line 5—5, Fig. 1;
Fig. 6 is a section on the line 6—6, Fig. 1; and
Fig. 7 is a bottom detail view.

Having more particular reference to the drawing, 8 designates a draw member arranged to be connected with a plow or other thing to be drawn for the purpose imposing thereon the draft effort of a team transmitted thereto by parts hereinafter described.

In the form shown, the draw member includes two arms 9 extending obliquely and forwardly from its shank portion, and a flat transverse member 10 connected to the front portions of those arms. The draw member may be made conveniently of flat bar-like material, bent to afford the arms 9 and twisted to afford a flat substantially horizontal surface in the transverse member 10. A plurality of bolt-holes 11 are in the member 10.

Two arms 12 extend forwardly from end portions of the transverse member 10. They are integral parts of a flat cross-bar 13 secured by bolts 14' to the member 10, the bolts being disposed in the holes 11 of the latter member. The parts 12 and 13 constitute a yoke, which may be adjusted laterally on the member 10 by transferring the bolts from one set of holes 11 to another set.

The arms 12 are formed with alined openings in which are disposed shiftable reduced end portions 14 of a flat transverse bar 15. This bar is connected by an arm 16 with the front end portion of a lever 17 fulcrumed intermediately of its ends on a rearwardly-extending part 18 of a standard or support 19 mounted on the cross-bar 13. The part 18 has thereon a rack 20 arranged to be engaged by and to hold the lever in adjusted positions. The fulcrum member for the lever is a pin or bolt 21, on which is held a coil-spring 22 by a nut 23, the spring bearing against the lever and maintaining it in engagement with the rack 20.

By a bolt or the like 24, two strap-like links 25 of flat material are connected swingably to the bar 15 at one side of its center, one of the links being at the upper side and the other at the lower side of that bar. The links 25 have bifurcated front end portions 26, between which are disposed and to which swingably are connected by pins or bolts 27 separated intermediate portions of a cross member 28.

The member 28 is formed of two parts 28' and 28'' of flat bar-like material curved toward each other into abutment at one end to afford a single terminal part 29 at one side of the connection of the member with the links 25. That end is of greater distance from that point of connection than the other end of the member 28. At the latter end of the member its parts are separated and have disposed between them, and swingably connected thereto by a pin or bolt 30, an arm 31.

The arm 31 extends from its point of swingable connection between the parts of the member 28 beyond the axis of connection of the links 25 to that member, and thence it continues as a rearwardly-extending member 32 having separated terminal portions 33 between which the bar 15 is disposed and to which they are connected swingably by a bolt or pin 34. The swingable connections of the links 25 and the arm 31 to the bar 15 are at opposite sides of the center of that bar. In its portion on the other side of its point of connection with the member 28, the arm 31 includes two separated strap-like parts 35, which are clamped by fasteners 36 to opposite sides of an elongated draft-arm 37.

At its free end, the draft-arm 37 is connected by straps 38 or their equivalent with a singletree 39 for the animal at the left-hand side of the team in the embodiment of the invention exemplified herein.

The terminal portion 29 of the member 28 is connected swingably at 40 by straps or their equivalent 41 to a draft-tree 42 at, or approximately at, the center thereof. At each side of its pivotal point, the draft-tree 42 is disposed between arms 43, which are mounted swingably on the draft-tree near its end at 44. Each pair of arms 43 extends beyond the end of the draft-tree and the parts thereof converge into abutting terminal portions held together by a fastener 45, and thereto is connected by straps or their equivalent 46 a singletree 47. The inner end portions of the arms 43, adjacent to the point of connection of the straps 41 to the draft-tree 42 are connected swingably by straps or their equivalent 48 with a singletree 49 positioned between the singletrees 47, the straps from the two pairs of arms converging to a single pivotal point 50 on the singletree 49.

With an animal draft device in which there are more animals connected with a swingable draft member on one side of its fulcrum than on the other, the part of that member has to be longer on the side of the less number of animals than on the side of the greater number, in order that their pull with about equal individual effort may be equalized. For example, in a four-animal team with three animals pulling against one on a single draft-arm, the single animal ordinarily would be connected about three times the distance from the fulcrum as the three others. With the fulcrum substantially in the line of draft, such an arrangement, when associated with a plow, results in the animal on the furrow side being required to walk in a line too far to that side.

Taking as an example the device shown herein, if the arm 31—37 were connected directly with the member 8 at point 27, the distance from that point to the place of connection of the straps 41 at point 40 would have to be greater in proportion to the distance from point 27 on the opposite side to the place of straps 38 for the single animal than is shown, and thus the right side draft animal would be farther to the right.

With the arrangement provided by this invention, it is possible to shorten the distance between the main fulcrum point at 27 and the place of connection of the greater number of animals at point 40, because of the double leverage afforded. It will be seen that the part 31 of the draft arm 37 fulcrumed at point 34 exerts leverage at point 30 on the cross member 28, which is fulcrumed at point 27.

The invention may be adapted to different unequal numbers of draft-animals on each side of the fulcrum point 27 by changing the length of the part 31 and the distance between points 30 and 34, by altering the position of the fulcrum point 27 on member 28, or by making both alterations.

In order also to meet different conditions of service, the yoke formed of the parts 12 and 13 may be shifted laterally by moving bolts 14 from one set of holes 11 to another set.

While the equalizer is in use, the line of pulling effort may be adjusted by shifting the bar 15 laterally by means of the adjusting-lever 17. As previously explained, this is of advantage, as it enables the operator readily to adapt the equalizer to irregularities of the ground being worked, as when a sidehill is being plowed.

Having thus described my invention, what I claim as new, and desire to secure by Letters Patent, is—

1. A draft-equalizer comprising a draw member, a laterally-shiftable transverse member on said draw member, a lever fulcrumed on one of said members arranged to shift said transverse member, a draft-arm swingably connected with said transverse member at one end and arranged in its other end portion to be connected with a draft-animal, a cross member swingably connected in one end portion with said draft-arm and in its other end portion adapted for connection with draft-animals, and links swingably connected with said transverse member and with said cross member between its ends.

2. A draft-equalizer comprising a draw member, a laterally-shiftable transverse member on said draw member, a support on one of said members having a rack thereon, a lever fulcrumed on said support and connected with said other member and arranged to be held in adjusted positions by said rack, a draft-arm swingably connected with said transverse member at one end and arranged in its other end portion to be connected with a draft-animal, a cross member swingably connected in one end portion with said draft-arm and in its other end portion adapted for connection with draft-animals, and links swingably connected with said transverse member and with said cross member between its ends.

3. A draft-equalizer comprising a draw member having forwardly-extending arms, a transverse member carried by and laterally shiftable in said arms, a lever fulcrumed on said draw member and connected with said transverse member, a draft-arm swingably connected with said transverse member at one end and arranged in its other end portion to be connected with a draft-animal, a cross member swingably connected in one end portion with said draft-arm and in its other end portion adapted for connection with draft-animals, and links connected with said transverse member and with said cross member between its ends.

4. In a draft-equalizer, the combination of a draw member, a laterally-shiftable transverse member on said draw member, means whereby said transverse member is shifted and held in adjusted positions, a cross member including two parts separated between their ends and joined in one end portion and there adapted to be connected with draft-animals, a draft-arm disposed in one end portion between said cross-member parts having a rearwardly-extending terminal portion swingably connected with said transverse member, said arm being connected swingably to end portions of said draft-member parts opposite to their joined ends and being adapted in its other end portion for connection with a draft-animal, and links swingably connected with said transverse member and with said cross-member parts between their ends.

5. In a draft-equalizer, the combination of a draw member, a laterally-shiftable transverse member on said draw member, a lever fulcrumed on one of said members arranged to shift said transverse member, a cross member including two parts separated between their ends and joined in one end portion and there adapted to be connected with draft-animals, a draft-arm disposed in one end portion between said cross-member parts having a rearwardly-extending terminal portion swingably connected with said transverse member, said arm being connected swingably to end portions of said draft-member parts opposite to their joined ends and being adapted in its other end portion for connection with a draft-animal, and links swingably connected with said transverse member and with said cross-member parts between their ends.

6. In a draft-equalizer, the combination of a draw member, a laterally-shiftable transverse member on said draw member, a support on one of said members having a rack thereon, a lever fulcrumed on said support and connected with said other member and arranged to be held in adjusted positions by said rack, a cross member including two parts separated between their ends and joined in one end portion and there adapted to be connected with draft-animals, a draft-arm disposed in one end portion between said cross-member parts having a rearwardly-extending terminal portion swingably connected with said transverse member, said arm being connected swingably to end portions of said draft-member parts opposite to their joined ends and being adapted in its other end portion for connection with a draft-animal, and links swingably connected with said transverse member and with said cross-member parts between their ends.

7. In a draft equalizer, the combination of a draw member, having forwardly-extending arms, a transverse member carried by and laterally shiftable in said arms, a lever fulcrumed on said draw member and connected with said transverse member, a cross member including two parts separated between their ends and joined in one end portion and there adapted to be connected with draft-animals, a draft-arm disposed in one end portion between said cross-member parts having a rearwardly-extending terminal portion swingably connected with said transverse member, said arm being connected swingably to end portions of said draft-member parts opposite to their joined ends and being adapted in its other end portion for connection with a draft-animal, and links swingably connected with said transverse member and with said cross-member parts between their ends.

In testimony whereof I affix my signature.

ARTHUR STARK.